US012670810B2

(12) United States Patent
Ozaki et al.

(10) Patent No.: US 12,670,810 B2
(45) Date of Patent: Jun. 30, 2026

(54) SURGICAL SIMULATOR AND SIMULATION METHOD

(71) Applicant: TERUMO KABUSHIKI KAISHA, Tokyo (JP)

(72) Inventors: Kouji Ozaki, Naka-gun (JP); Ayumi Hattori, Atsugi (JP); Satoshi Kikuchi, Tokyo (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 550 days.

(21) Appl. No.: 18/297,958

(22) Filed: Apr. 10, 2023

(65) Prior Publication Data

US 2023/0245591 A1 Aug. 3, 2023

Related U.S. Application Data

(63) Continuation of application No. PCT/JP2021/043539, filed on Nov. 29, 2021.

(30) Foreign Application Priority Data

Dec. 8, 2020 (JP) ................................. 2020-203114

(51) Int. Cl.
*G09B 23/28* (2006.01)

(52) U.S. Cl.
CPC ......... *G09B 23/285* (2013.01); *G09B 23/286* (2013.01)

(58) Field of Classification Search
CPC ...... G09B 23/28; G09B 23/30; G09B 23/303; G09B 23/306; G09B 23/32; G09B 23/34
See application file for complete search history.

(56) References Cited

U.S. PATENT DOCUMENTS

| | | | |
|---|---|---|---|
| 6,511,325 B1 | 1/2003 | Lalka et al. | |
| 2010/0042201 A1* | 2/2010 | Sherif | A61F 2/90 |
| | | | 606/228 |
| 2012/0071960 A1* | 3/2012 | Tani | A61F 2/07 |
| | | | 623/1.15 |

(Continued)

FOREIGN PATENT DOCUMENTS

| | | |
|---|---|---|
| CN | 201655119 U | 11/2010 |
| CN | 202843681 U | 4/2013 |

(Continued)

OTHER PUBLICATIONS

International Search Report (PCT/ISA/210) with English translation and Written Opinion (PCT/ISA/237) mailed on Feb. 15, 2022, by the Japanese Patent Office as the International Searching Authority for International Application No. PCT/JP2021/043539 (10 pages).

(Continued)

*Primary Examiner* — Kang Hu
*Assistant Examiner* — Correll T French
(74) *Attorney, Agent, or Firm* — .Buchanan Ingersoll & Rooney PC

(57) ABSTRACT

A surgical simulator and a simulation method are disclosed. The surgical simulator includes a blood vessel model. The blood vessel model includes an aorta model simulating a case of replacing a part of the thoracic aorta of a human body with an artificial blood vessel. The aorta model includes a simulated vessel and an artificial blood vessel, or a medical device, connected to the simulated vessel.

19 Claims, 10 Drawing Sheets

(56) References Cited

U.S. PATENT DOCUMENTS

| | | | |
|---|---|---|---|
| 2012/0156666 | A1 | 6/2012 | Okano |
| 2014/0246798 | A1* | 9/2014 | Okano ................. A61K 9/0024 |
| | | | 264/28 |
| 2018/0098852 | A1 | 4/2018 | Ozaki et al. |
| 2021/0330865 | A1* | 10/2021 | Miyama ............... C08L 53/025 |

FOREIGN PATENT DOCUMENTS

| | | | | |
|---|---|---|---|---|
| CN | 203179376 U | | 9/2013 | |
| JP | 2011075907 A | | 4/2011 | |
| JP | 2012086004 A | | 5/2012 | |
| JP | 2015064487 A | | 4/2015 | |
| JP | 2016057451 A | * | 4/2016 | |
| JP | 2016212233 A | | 12/2016 | |
| WO | WO-2018034074 A1 | * | 2/2018 | ............. G09B 23/30 |

OTHER PUBLICATIONS

Office Action/Search Report (The First Office Action) issued on Jul. 19, 2025, in corresponding Chinese Patent Application No. 202180067971.6 and machine English translation of the Office Action/Search Report. (20 pages).
English Translations of the International Search Report (Form PCT/ISA/210) and the Written Opinion of the International Searching Authority (Form PCT/ISA/237) issued Feb. 15, 2022, by the Japan Patent Office in Corresponding International Application No. PCT/JP2021/043539. (7 pages).

* cited by examiner

: FLOW OF WATER
: DIRECTION OF CATHETER INSERTION

SURGICAL SIMULATOR AND SIMULATION METHOD

CROSS-REFERENCES TO RELATED APPLICATIONS

This application is a continuation of International Application No. PCT/JP2021/043539 filed on Sep. 29, 2021, which claims priority to Japanese Application No. 2020-203114 filed on Dec. 8, 2020, the entire content of both of which is incorporated herein by reference.

TECHNOLOGICAL FIELD

The present disclosure generally relates to a surgical simulator and a simulation method.

BACKGROUND DISCUSSION

For example, Japanese Patent Application Publication No. 2015-64487 A discloses a surgical simulator used for training in Thoracic Endovascular Aortic Repair in which a stent graft is deployed in a thoracic aorta model mimicking the thoracic aorta of a human body.

In the treatment of thoracic aorta aneurysms, a thoracic aorta aneurysm may recur after an operation to replace a part of the thoracic aorta with an artificial blood vessel. In recent years, with the evolution of therapeutic devices, Thoracic Endovascular Aortic Repair has enabled percutaneous deployment of a stent graft in a lesion of the thoracic aorta (aneurysm portion or dissected portion) even in retreatment cases. Furthermore, in occurrence of Stanford type B aortic dissection in which a wall of the descending aorta is torn and divided into two lumens (a true lumen and a false lumen), a stent graft may be deployed in the descending aorta by Thoracic Endovascular Aortic Repair in the early phase. In this manner, with the progress of therapeutic devices, it has become possible to perform percutaneous treatment even in complicated cases, and at the same time, doctors are required to quickly learn how to operate leading-edge therapeutic devices.

A surgical simulator disclosed in Japanese Patent Application Publication No. 2015-64487 A is not designed to be used for training to deal with such complicated cases and does not reproduce a feeling of graft insertion which a doctor experiences in a complicated case. In addition, the surgical simulator disclosed in Japanese Patent Application Publication No. 2015-64487 A is not a tool for learning stenting while actually using a computed tomography (CT) scan.

SUMMARY

A surgical simulator and a simulation method are disclosed that enable simulation of Thoracic Endovascular Aortic Repair for complicated thoracic aorta cases and efficient learning of Thoracic Endovascular Aortic Repair.

An aspect of the disclosure is a surgical simulator including a blood vessel model, the blood vessel model including an aorta model mimicking a case of replacing a part of the thoracic aorta of a human body with an artificial blood vessel, and the aorta model including a simulated vessel and an artificial blood vessel, or a medical device, connected to the simulated vessel.

Another aspect of the disclosure is a surgical simulator including: a blood vessel model, the blood vessel model including an aorta model simulating a case of replacing a part of the thoracic aorta of a human body with an artificial blood vessel, the aorta model including a simulated vessel and an artificial blood vessel, the aorta model including a connection between the simulated vessel and the artificial blood vessel, the connection including an annular end that forms the simulated vessel and an annular connection that forms the artificial blood vessel of the aorta model, the annular connection being connected to the annular end in a liquid-tight manner while being inserted into a lumen of the annular end; a tank configured house the aorta model submerged in water, the tank including a bottom wall, a first side wall, and a second side wall protruding from the bottom wall of the tank, and wherein the first side wall and the second side wall face each other; a connection circuit configured to circulate the water in the tank into the blood vessel model; a pump configured to apply arterial pressure to the water in the blood vessel model; and wherein the aorta model has a first interval between the aorta model and the first side wall, the first interval being shorter than a second interval between the aorta model and the second side wall, and the second interval being longer than a height of the second side wall.

A further aspect of the disclosure is a simulation method using the surgical simulator, the method including: supplying water in the blood vessel model; operating a catheter while the water flows in the blood vessel model to guide a stent graft embedded in a tip of the catheter into the aorta model; and expanding the stent graft after the embedding of the stent graft in the tip of the catheter into the aorta model.

According to the disclosure, the aorta model includes the simulated vessel and the artificial blood vessel, which enables simulation of Thoracic Endovascular Aortic Repair for complicated thoracic aorta cases. Therefore, it is possible to learn Thoracic Endovascular Aortic Repair efficiently.

BRIEF DESCRIPTION OF THE DRAWINGS

FIG. 1 is a front view of a surgical simulator according to an embodiment of the disclosure.

FIG. 2 is a plan view of a simulator body illustrated in FIG. 1.

FIG. 7 is a view for describing a water supplying step and a guiding step.

DETAILED DESCRIPTION

Figure 3:
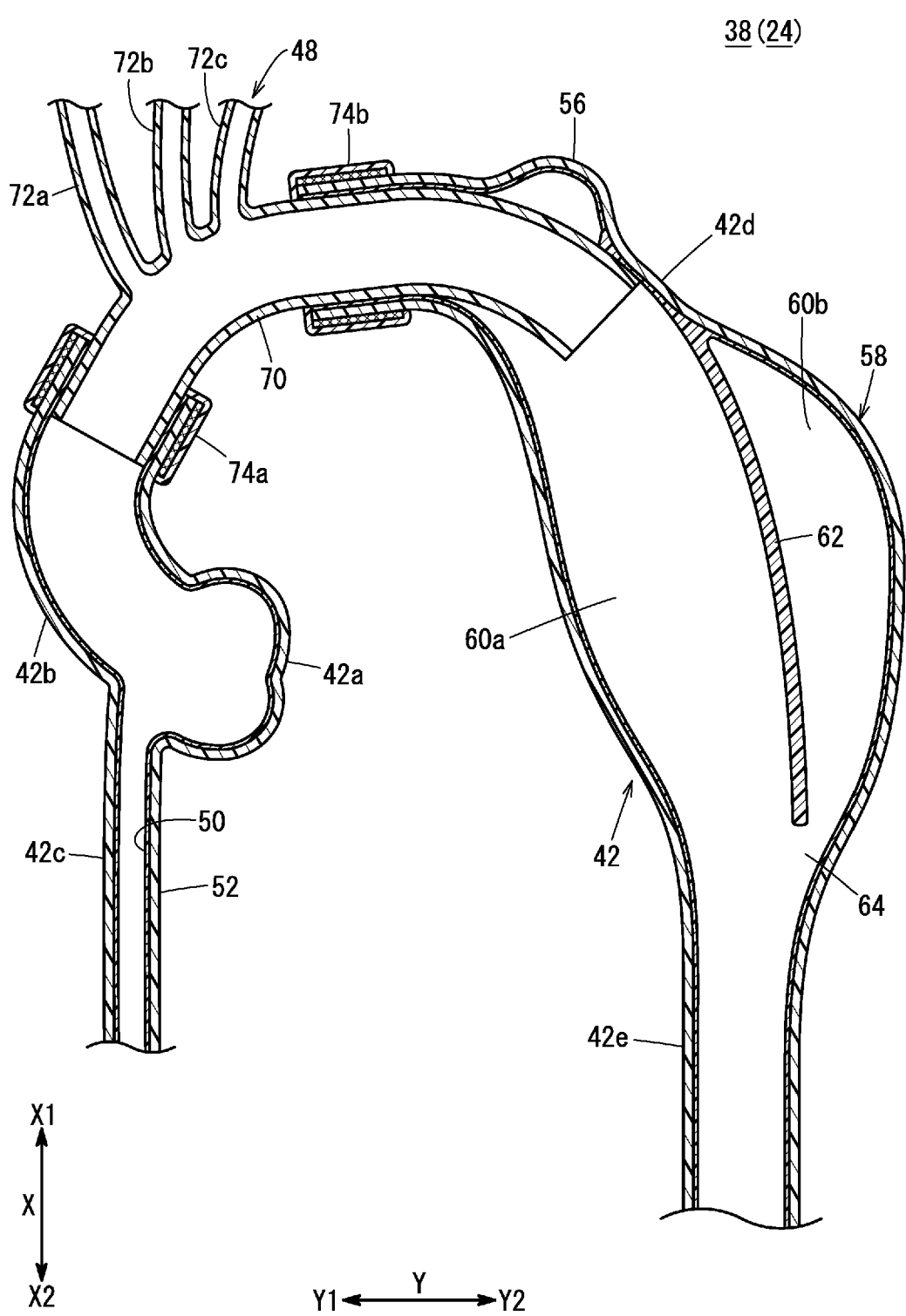
FIG. 3 is a partially omitted longitudinal sectional view of an aorta model illustrated in FIG. 2.

Set forth below with reference to the accompanying drawings is a detailed description of embodiments of a surgical simulator and a simulation method. Note that since embodiments described below are preferred specific examples of the present disclosure, although various technically preferable limitations are given, the scope of the present disclosure is not limited to the embodiments unless otherwise specified in the following descriptions.

A surgical simulator 10 according to an embodiment of the disclosure is used for training in Thoracic Endovascular Aortic Repair of the thoracic aorta.

Figure 1:
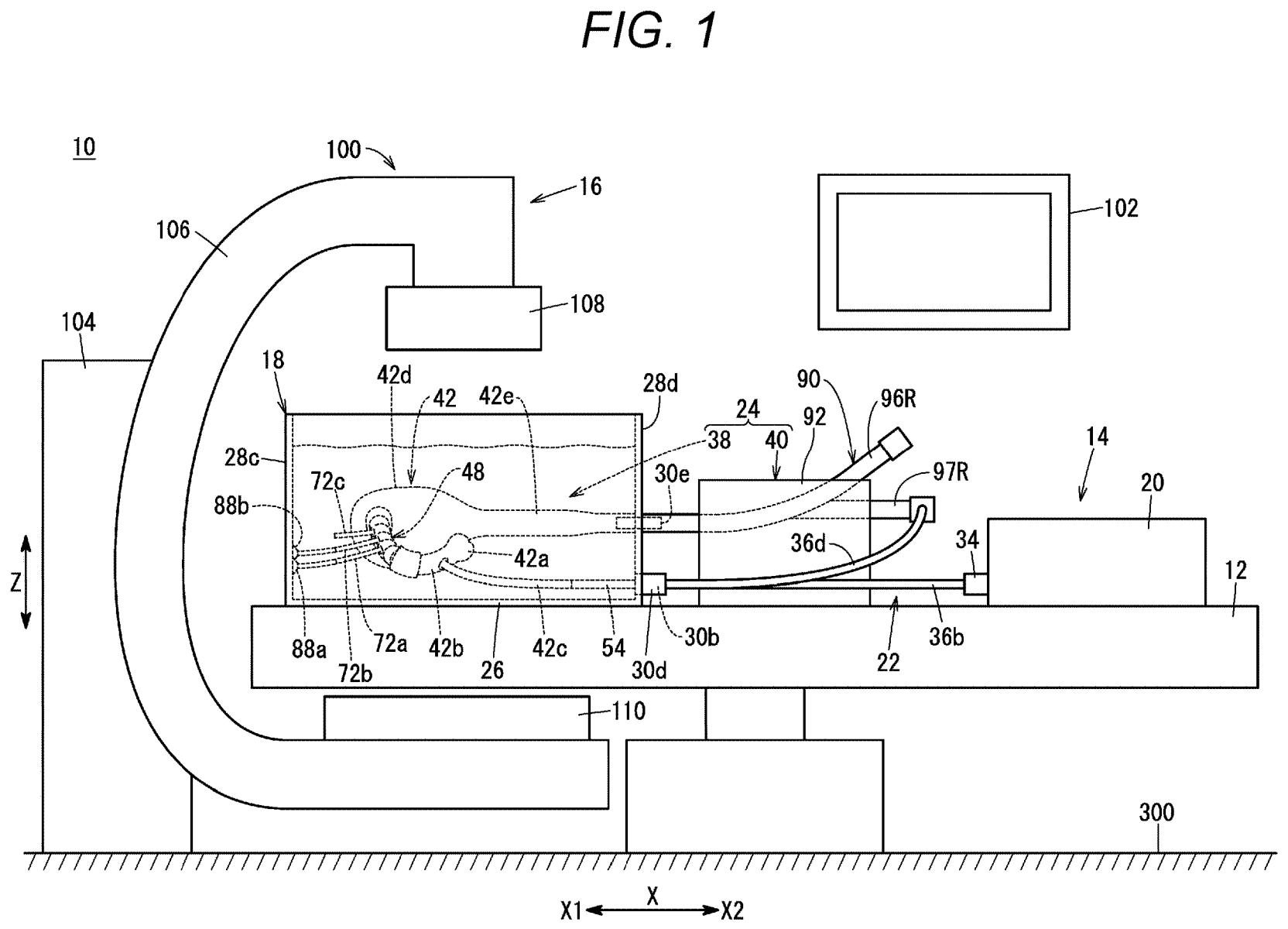

As illustrated in FIG. 1, the surgical simulator 10 includes an operating table 12 installed on a floor 300, a simulator body 14 located on the operating table 12, and a radiography device 16 installed on the floor 300. The operating table 12 extends in one direction (direction of arrow X). The operating table 12 can move up and down in the height direction (direction of arrow Z).

Figure 2:
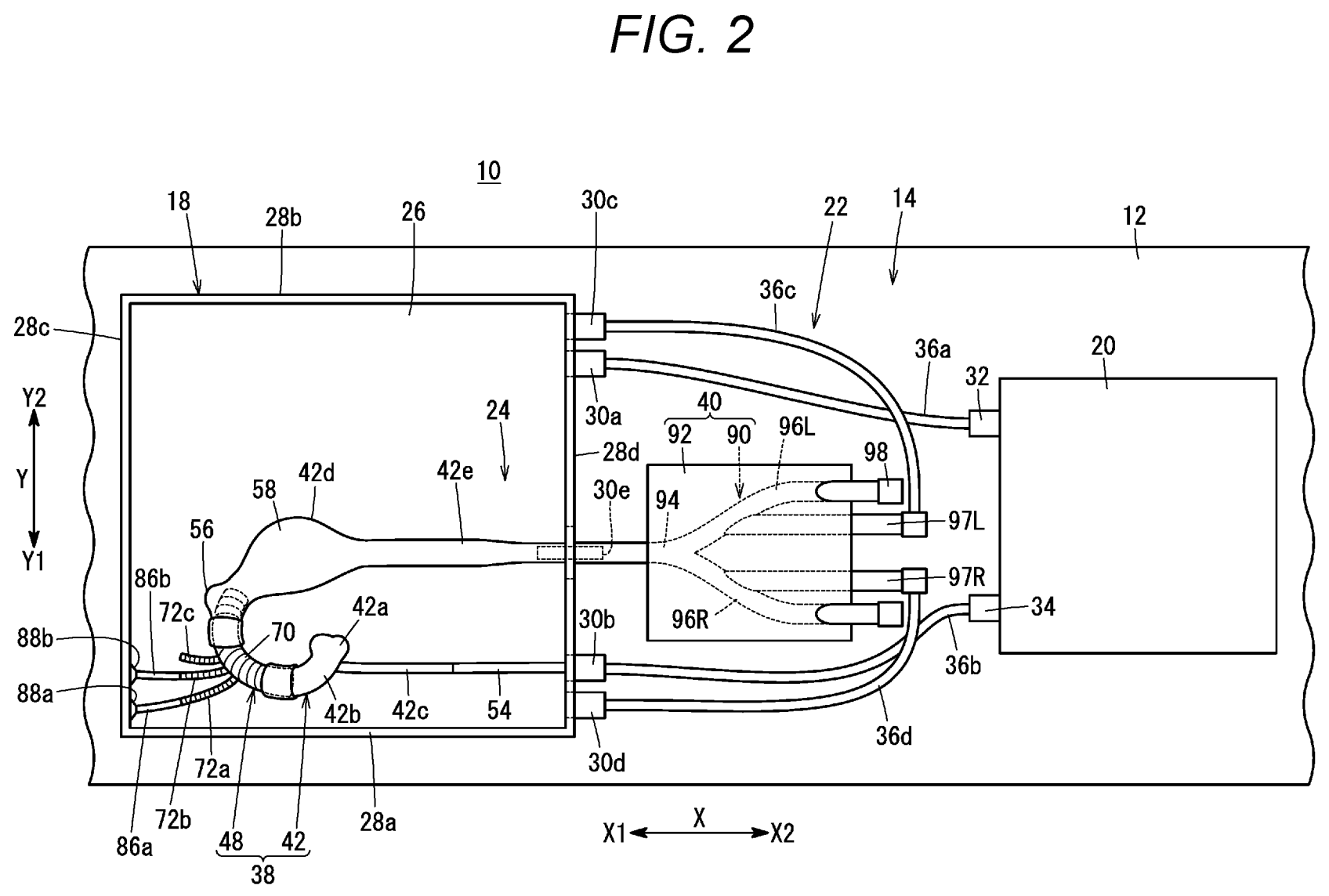

As illustrated in FIGS. 1 and 2, the simulator body 14 includes a tank 18, a pump 20, a connection circuit 22, and a blood vessel model 24. The tank 18 can be fabricated from or made of, for example, polyvinyl chloride (PVC). The tank 18 is disposed at one end of the operating table 12 in the longitudinal direction (direction of arrow X1).

In FIG. 2, the tank 18 is located substantially at the center of the operating table 12 in the transverse direction (width direction, direction of arrow Y). The tank 18 can have a box shape with an open top. The tank 18 can be formed of or fabricated from a transparent plastic, for example, PVC. The tank 18 can include a quadrangular bottom wall 26 (see FIG. 2) and first to fourth side walls 28a to 28d protruding in the height direction (direction of arrow Z) from each side of the bottom wall 26.

The first side wall 28a is located at an end of the bottom wall 26 in a direction of arrow Y1 (one side of the operating table 12 in the transverse direction). The second side wall 28b is located at an end of the bottom wall 26 in a direction of arrow Y2 (the other side of the operating table 12 in the transverse direction). The third side wall 28c is located at an end of the bottom wall 26 in the direction of arrow X1. The fourth side wall 28d is located at an end of the bottom wall 26 in a direction of arrow X2 (opposite to the direction of arrow X1).

The fourth side wall 28d is provided with a first tube connector 30a, a second tube connector 30b, a third tube connector 30c, a fourth tube connector 30d, and a fifth tube connector 30e. The material, shape, and size of the tank 18 are designed appropriately.

The pump 20 is used for suctioning water in the tank 18 and supplying the water to the blood vessel model 24. The pump 20 supplies the water to the blood vessel model 24 in such a manner that pressure comparable to arterial pressure is applied to the blood vessel model 24. The pump 20 can include a suction port 32 for suctioning the water and a discharge port 34 for discharging the water.

The connection circuit 22 is used for circulating the water in the tank 18 through the blood vessel model 24. The connection circuit 22 includes a first connecting tube 36a, a second connecting tube 36b, a third connecting tube 36c, and a fourth connecting tube 36d. The first connecting tube 36a forms a channel for guiding the water in the tank 18 to the pump 20. The first connecting tube 36a connects the first tube connector 30a and the suction port 32 of the pump 20. A lumen of the first connecting tube 36a communicates with the tank 18 through the first tube connector 30a. The second connecting tube 36b forms a channel for guiding the water discharged from the pump 20 into the blood vessel model 24. The second connecting tube 36b connects the discharge port 34 of the pump 20 and the second tube connector 30b.

The third connecting tube 36c and the fourth connecting tube 36d each form a channel for returning the water supplied to the blood vessel model 24 to the tank 18. The third connecting tube 36c connects the third tube connector

30c and a simulated femoral artery 90. The fourth connecting tube 36d connects the fourth tube connector 30d and the simulated femoral artery 90.

The blood vessel model 24 can include an aorta model 38 submerged in the tank 18 and a femoral artery model 40 disposed outside the tank 18.

As illustrated in FIGS. 2 and 3, the aorta model 38 simulates a case of replacing a part of the thoracic aorta of a human body with an artificial blood vessel. The aorta model 38 can include a simulated vessel 42 and an artificial blood vessel 48, or a medical device, connected to the simulated vessel 42. In this embodiment, the artificial blood vessel 48 is located in a part of the aorta model 38 corresponding to the aortic arch of a human body.

Figure 8:
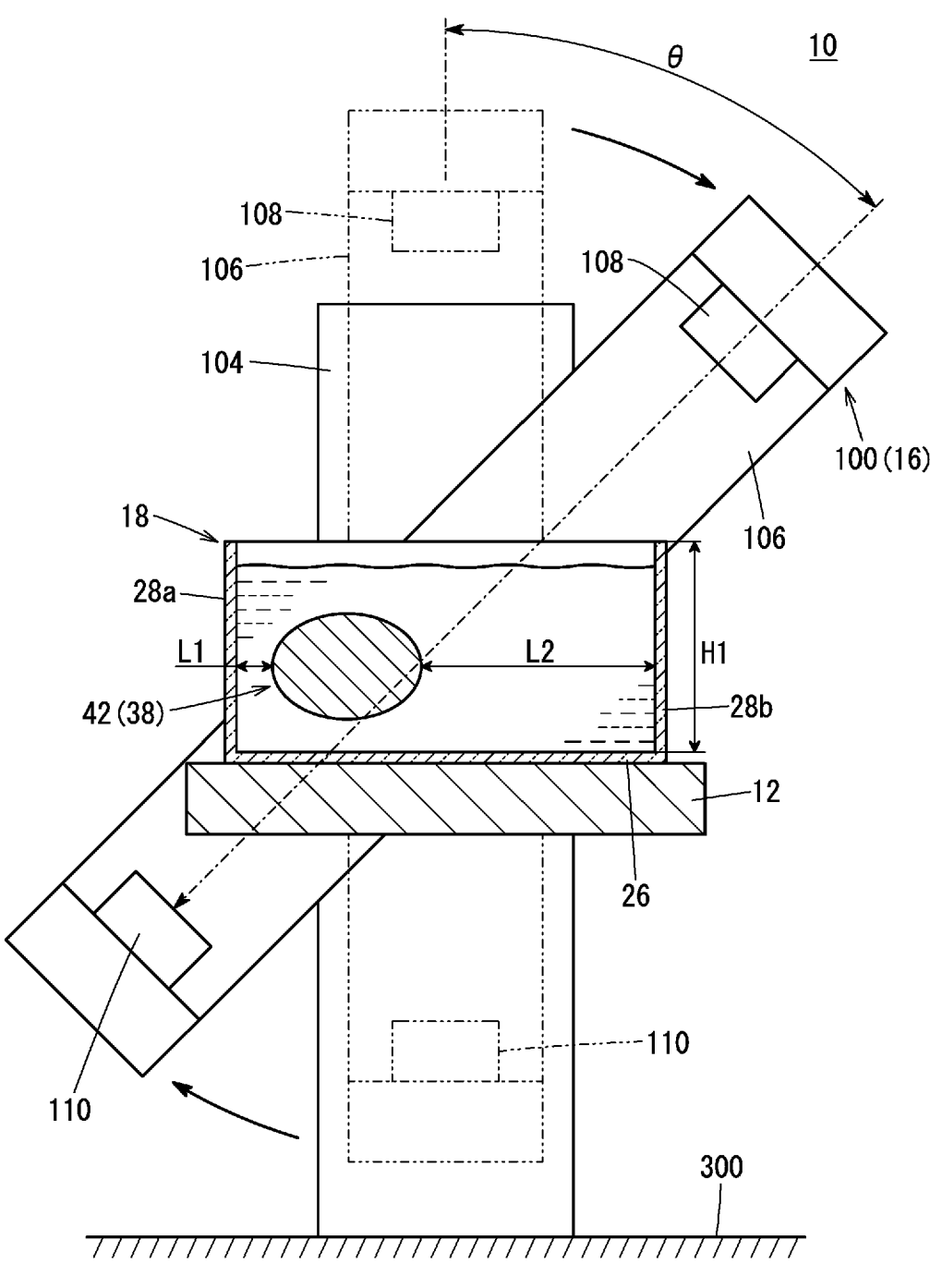
FIG. 8 is a view for describing a radiography step.

In FIG. 8, a first interval L1 between the aorta model 38 and the first side wall 28a is shorter than a second interval L2 between the aorta model 38 and the second side wall 28b. The second interval L2 is longer than a height H1 of the second side wall 28b (a length from the bottom wall 26 to a protruding end of the second side wall 28b). The aorta model 38 is adjacent to the first side wall 28a. In other words, the aorta model 38 is placed in a position closer to the first side wall 28a (direction of arrow Y1) relative to the center of the tank 18 in the direction of arrow Y.

As illustrated in FIG. 3, the simulated vessel 42 can include a tubular inner wall portion 50 and a tubular outer wall portion 52 on the outer periphery of the inner wall portion 50. The inner wall portion 50 and the outer wall portion 52 can both be fabricated from or made of silicone. The inner wall portion 50 has a thickness smaller than that of the outer wall portion 52. Specifically, the inner wall portion 50 preferably has, for example, a thickness of 0.2 mm to 0.7 mm, more preferably 0.3 mm to 0.6 mm, and still more preferably about 0.5 mm. The outer wall portion 52 preferably has, for example, a thickness of 1.3 mm to 2.5 mm, more preferably 1.5 mm to 2.2 mm, and still more preferably about 2.0 mm. Thicknesses of the inner wall portion 50 and the outer wall portion 52 are designed appropriately.

The inner wall portion 50 has elongation (i.e., a breaking point of the inner wall portion 50 expressed as a percentage of an original length of the inner wall portion 50), which is greater than the elongation of the outer wall portion 52. Specifically, the inner wall portion 50 preferably, for example, has elongation of 500% to 700%, more preferably 550% to 650%, still more preferably about 600%. The outer wall portion 52 preferably, for example, has elongation of 200% to 400%, more preferably 250% to 350%, and still more preferably about 300%. Elongation of each of the inner wall portion 50 and the outer wall portion 52 is designed appropriately.

The inner wall portion 50 has a tear strength greater than the tear strength of the outer wall portion 52. Specifically, the inner wall portion 50 preferably, for example, has a tear strength of 30 kgf to 40 kgf, and more preferably about 36 kgf. The outer wall portion 52 preferably, for example, has a tear strength of 10 kgf to 20 kgf, and more preferably about 17 kgf.

A surfactant can be applied to the inner surface of the inner wall portion 50. Accordingly, when inserting a stent graft 202 which is folded (see FIG. 7), it is possible to prevent the stent graft 202 from being stuck in the inner surface of the inner wall portion 50.

The simulated vessel 42 includes a simulated aortic root 42a, a simulated ascending aorta 42b, a simulated coronary artery 42c, a simulated descending aorta 42d, and a simulated abdominal aorta 42e. The simulated aortic root 42a simulates the aortic root of a human body. The simulated ascending aorta 42*b* simulates the ascending aorta of a human body. The simulated ascending aorta 42*b* extends from the simulated aortic root 42*a* in the direction of arrow X1. An elongated end of the simulated ascending aorta 42*b* (end in the direction of arrow X1) is connected to the artificial blood vessel 48. The simulated abdominal aorta 42*e* simulates the abdominal aorta of a human body.

The simulated coronary artery 42*c* simulates the coronary artery of a human body. The simulated coronary artery 42*c* extends from the simulated aortic root 42*a* in the direction of arrow X2. In FIG. 2, a guiding tube 54 is connected to an elongated end of the simulated coronary artery 42*c* in a liquid-tight manner. The guiding tube 54 is connected to the second tube connector 30*b* located in the fourth side wall 28*d* of the tank 18. In other words, a lumen of the guiding tube 54 communicates with a lumen of the second connecting tube 36*b* through the second tube connector 30*b*.

As illustrated in FIG. 3, the simulated descending aorta 42*d* simulates the descending aorta, a part of the aortic arch, of a human body. The simulated descending aorta 42*d* extends in the direction of arrow X. An end of the simulated descending aorta 42*d* in the direction of arrow X1 is connected to the artificial blood vessel 48.

In FIG. 2, the simulated abdominal aorta 42*e* extends from the simulated descending aorta 42*d* in the direction of arrow X2. An extending end of the simulated abdominal aorta 42*e* is coupled to the fifth tube connector 30*e* located in the fourth side wall 28*d* of the tank 18.

The simulated vessel 42 is provided with an aneurysm portion 56 and a dissected portion 58. The aneurysm portion 56 is located at an end of the simulated descending aorta 42*d* in the direction of arrow X1. The dissected portion 58 is located in an intermediate portion of the simulated descending aorta 42*d*. The dissected portion 58 simulates what is called Stanford type B aortic dissection. The dissected portion 58 includes a partition wall 62 that partitions a lumen of the simulated descending aorta 42*d* into a true lumen 60*a* and a false lumen 60*b*. The partition wall 62 is provided with a hole (opening) 64 that allows the true lumen 60*a* and the false lumen 60*b* to communicate with each other.

In FIG. 3, the artificial blood vessel 48 is connected to the simulated vessel 42 and forms the blood vessel model 24 corresponding to a case of what is called an elephant trunk. The artificial blood vessel 48 can be fabricated from or made of, for example, polyethylene terephthalate (PET), polyurethane, and polytetrafluoroethylene (PTFE). The artificial blood vessel 48 includes an artificial blood vessel body 70 that connects the simulated ascending aorta 42*b* and the simulated descending aorta 42*d* and includes a first branched tube 72*a*, a second branched tube 72*b*, and a third branched tube 72*c* that extend from the artificial blood vessel body 70 in the direction of arrow X1.

Figure 4:
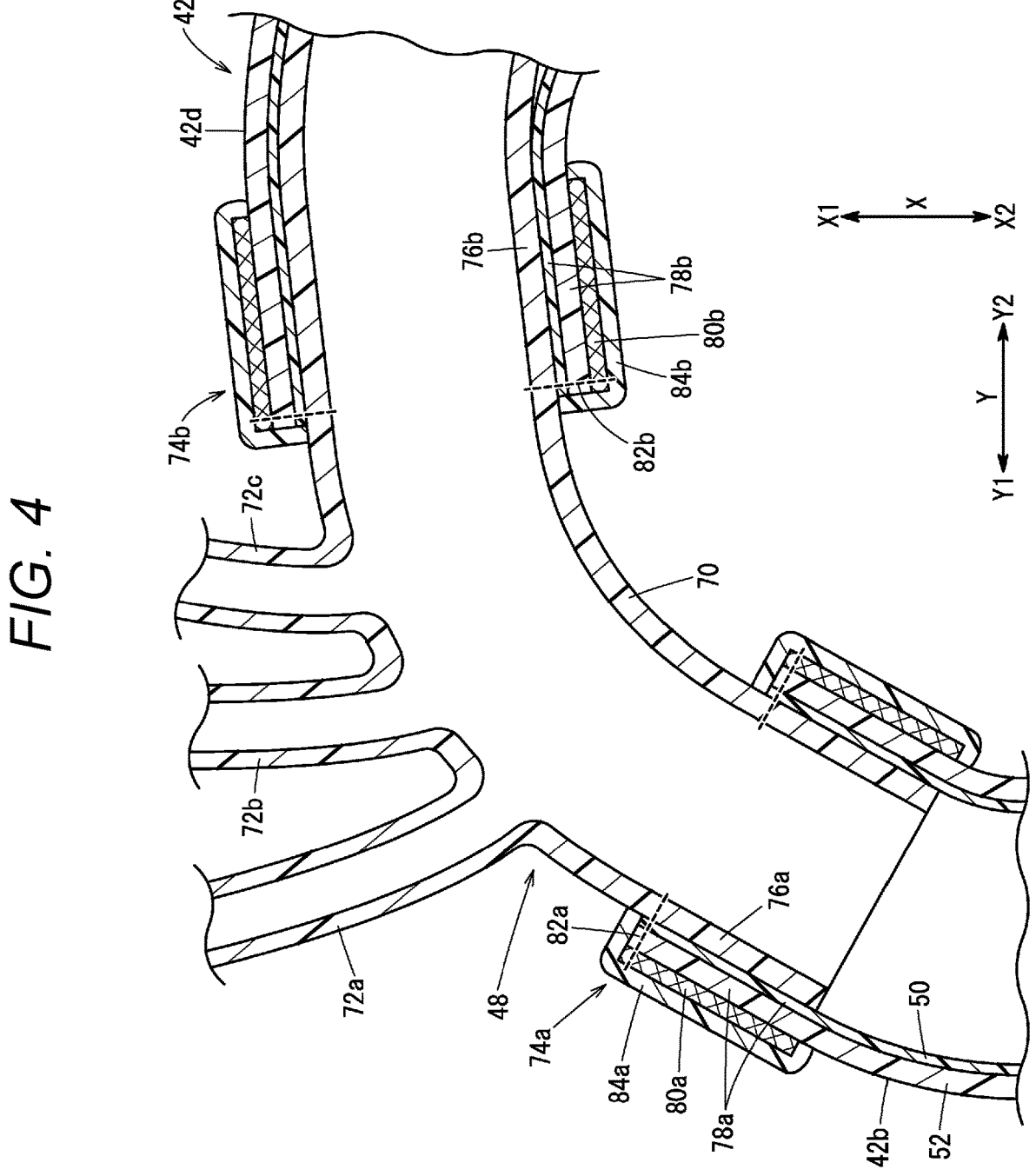
FIG. 4 is a partially enlarged longitudinal sectional view of the aorta model illustrated in FIG. 3.
Figure 5:
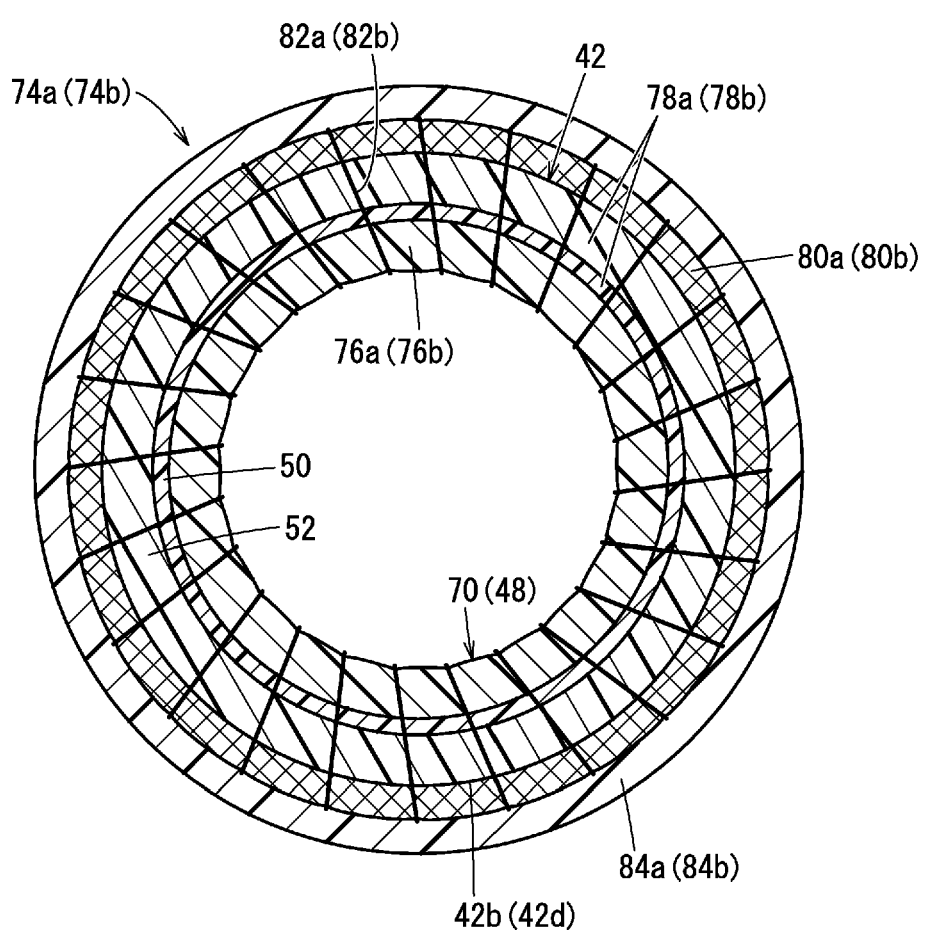
FIG. 5 is a transverse cross-sectional view of a first connection (second connection) illustrated in FIG. 3.

As illustrated in FIGS. 4 and 5, a first connection 74*a* connecting the artificial blood vessel body 70 and the simulated ascending aorta 42*b* includes a first annular connection 76*a*, a first annular end 78*a*, a first non-woven fabric 80*a*, a first suture 82*a*, and a first sealing member 84*a*. The first annular connection 76*a* forms an end of the artificial blood vessel body 70. The first annular end 78*a* forms an end of the simulated ascending aorta 42*b* in the direction of arrow X1. The outer periphery of the first annular connection 76*a* is connected to the inner periphery of the first annular end 78*a* (inner periphery of the inner wall portion 50).

The first non-woven fabric 80*a* can be an annular mesh member and is located on the outer periphery of the first annular end 78*a* (outer periphery of the outer wall portion 52). In other words, in the first connection 74*a*, the first annular connection 76*a*, the first annular end 78*a*, and the first non-woven fabric 80*a* overlap each other sequentially and radially outward. The first non-woven fabric 80*a* extends annularly around the outer periphery of the first annular end 78*a*. The first non-woven fabric 80*a* can include, for example, a soft plastic material. Examples of the soft plastic material included in the first non-woven fabric 80*a* include polyester and other fibers and silicone.

The first annular connection 76*a*, the first annular end 78*a*, and the first non-woven fabric 80*a* overlapping each other are sewn with the first suture 82*a*. The first suture 82*a* is located at an end of the first annular end 78*a* closer to the first branched tube 72*a* (see FIG. 4). The first sealing member 84*a* can be, for example, a plastic material such as silicone. The first sealing member 84*a* covers, for example, the first non-woven fabric 80*a* thoroughly (i.e., completely). The first sealing member 84*a* is filled in openings or gaps of the first non-woven fabric 80*a*. The first sealing member 84*a* covers an end surface of the first annular end 78*a* (see FIG. 4). Note that the first sealing member 84*a* does not cover the artificial blood vessel body 70 directly.

A second connection 74*b* connecting the artificial blood vessel body 70 and the simulated descending aorta 42*d* can include a second annular connection 76*b*, a second annular end 78*b*, a second non-woven fabric 80*b*, a second suture 82*b*, and a second sealing member 84*b*. The second annular connection 76*b* forms an intermediate portion of the artificial blood vessel body 70. The second annular end 78*b* forms an end of the simulated descending aorta 42*d* in the direction of arrow X1. The outer periphery of the second annular connection 76*b* is connected to the inner periphery of the second annular end 78*b* (inner periphery of the inner wall portion 50).

The second non-woven fabric 80*b* can be an annular mesh member and is located on the outer periphery of the second annular end 78*b* (outer periphery of the outer wall portion 52). In other words, in the second connection 74*b*, the second annular connection 76*b*, the second annular end 78*b*, and the second non-woven fabric 80*b* overlap each other sequentially and radially outward. The second non-woven fabric 80*b* extends annularly around the outer periphery of the second annular end 78*b*. The second non-woven fabric 80*b* can be fabricated from or made of, for example, a soft plastic material. Examples of the soft plastic material of the second non-woven fabric 80*b* can include polyester and other fibers and silicone.

The second annular connection 76*b*, the second annular end 78*b*, and the second non-woven fabric 80*b* overlapping each other are sewn with the second suture 82*b*. The second suture 82*b* is located at an end of the second annular end 78*b* closer to the third branched tube 72*c* (see FIG. 4). The second sealing member 84*b* can be fabricated from, for example, a plastic material such as silicone. The second sealing member 84*b* covers the second non-woven fabric 80*b* thoroughly. The second sealing member 84*b* can fill in openings or gaps of the second non-woven fabric 80*b*. The second sealing member 84*b* covers an end surface of the second annular end 78*b* (see FIG. 4).

As illustrated in FIG. 3, the other end of the artificial blood vessel body 70 is inserted into the lumen of the simulated descending aorta 42*d* to cover the aneurysm portion 56 from inside. In FIG. 2, a first tube 86*a* is connected to an extending end of the first branched tube 72*a* in a liquid-tight manner. The first tube 86*a* is provided with a first lock 88*a* detachably attached to a desired position in the third side wall 28c of the tank 18. The first lock 88a has a suction cup (or sucker) that sticks to the inner surface of the third side wall 28c.

A second tube 86b is connected to an extending end of the second branched tube 72b in a liquid-tight manner. The second tube 86b is provided with a second lock 88b detachably attached to a desired position in the third side wall 28c of the tank 18. The second lock 88b includes a suction cup (or sucker) that sticks to the inner surface of the third side wall 28c. An extending end of a third branched tube 72c has an opening communicating with the inside of the tank 18.

This aorta model 38 can be, for example, manufactured in the following manner. First, 3D data of the thoracic aorta and the abdominal aorta of a patient (data including a thoracic aorta aneurysm and Stanford type B aortic dissection) is created from clinical data (such as Digital Imagining and Communications in Medicine (DICOM) data). Based on the 3D data, a 3D-printed blood vessel mold is created. Then, silicone is applied to the blood vessel mold to form the inner wall portion 50. Specifically, the blood vessel mold is immersed (dipped) in the silicone. Accordingly, the inner wall portion 50 of the simulated vessel 42 is formed.

Next, silicone is applied to the outer surface of the inner wall portion 50 to form the outer wall portion 52. Specifically, the blood vessel mold provided with the inner wall portion 50 of silicon is immersed (dipped) in the silicone. Accordingly, the outer wall portion 52 of the simulated vessel 42 is formed. After that, the blood vessel mold is dissolved and removed from the inner side of the inner wall portion 50. A simulated vessel simulating the thoracic aorta and the abdominal aorta of a patient is formed in this manner, and a part of the simulated vessel that corresponds to the aortic arch of a human body is replaced with the artificial blood vessel 48, or a medical device. Through these processes, the aorta model 38 including the simulated vessel 42 and the artificial blood vessel 48 can be provided. In other words, the aorta model 38 corresponds to an actual blood vessel having a deficient part which is replaced by the artificial blood vessel 48, or a therapeutic device.

In FIGS. 1 and 2, the femoral artery model 40 can be disposed on the operating table 12, being adjacent to the fourth side wall 28d of the tank 18 in the direction of arrow X2. The femoral artery model 40 includes a simulated femoral artery 90 and a block 92 embedded with the simulated femoral artery 90.

The simulated femoral artery 90 can be, for example, a tubular member molded in an integrated manner fabricated from, for example, a plastic material such as silicone. The simulated femoral artery 90 has transparency. The simulated femoral artery 90 can include a coupling tube 94, a simulated left femoral artery 96L, a simulated right femoral artery 96R, a left connecting channel 97L, and a right connecting channel 97R.

One end of the coupling tube 94 is exposed from the block 92 and coupled to the fifth tube connector 30e. In other words, a lumen of the coupling tube 94 communicates with a lumen of the simulated abdominal aorta 42e through the fifth tube connector 30e. The simulated left femoral artery 96L and the simulated right femoral artery 96R branch and extend from the other end of the coupling tube 94. In other words, one end of the simulated left femoral artery 96L is connected to the other end of the coupling tube 94. One end of the simulated right femoral artery 96R is connected to the other end of the coupling tube 94. Other ends of the simulated left femoral artery 96L and the simulated right femoral artery 96R are exposed from the block 92.

Figure 7:
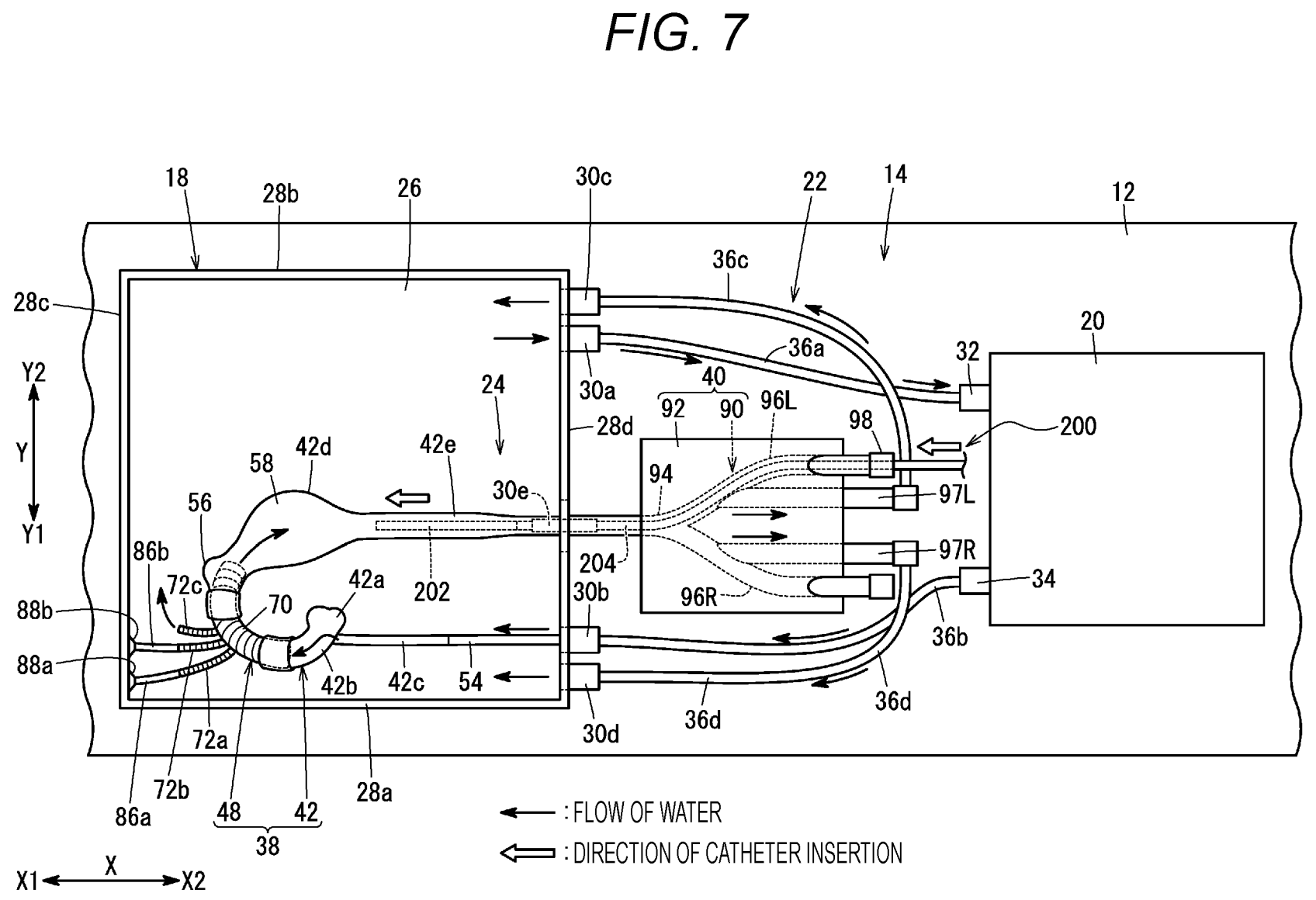

The other end of the simulated left femoral artery 96L is provided with a check valve 98 into which a medical device 200 is inserted (see FIG. 7). The check valve 98 helps prevent water leakage from the simulated left femoral artery 96L. The left connecting channel 97L branches from a side of the simulated left femoral artery 96L closer to the coupling tube 94 than the check valve 98 and is connected to the third connecting tube 36c. The other end of the simulated right femoral artery 96R may be closed or may be provided with a check valve as in the simulated left femoral artery 96L. The right connecting channel 97R branches from a side of the simulated right femoral artery 96R closer to the coupling tube 94 and is connected to the fourth connecting tube 36d.

The block 92 has a cuboid shape. The block 92 can be fabricated from, for example, a hard plastic material. In other words, the block 92 helps prevent the simulated femoral artery 90 from being elastically deformed radially outward. Accordingly, pressure (arterial pressure) from the pump 20 hardly escapes from the simulated femoral artery 90, and the aorta model 38 pulsates like the actual human aorta. An example of the hard plastic material included in the block 92 can include, for example, silicone. The block 92 has transparency. For this reason, from outside the block 92, a user can visually check the medical device 200 inserted into a lumen of an artery model body. Furthermore, surrounding the simulated femoral artery 90 with the block 92 can enhance the durability of the simulated femoral artery 90.

As illustrated in FIG. 1, the radiography device 16 includes a radiography device body 100 disposed on the operating table 12 in the direction of arrow X1 and a display 102 that shows images captured by the radiography device body 100. The radiography device body 100 can include a base 104 installed on the floor 300, an arm 106 having a C-shape and rotatable relative to the base 104, a radiation source 108 located at one end of the arm 106, and a detector 110 located at the other end of the arm 106.

The radiation source 108 irradiates a subject. The detector 110 detects the radiation penetrating the subject. The radiography device body 100 can includes a controller which creates a radiographic image based on the radiation detected by the detector 110 and causes the display 102 to show the image. The display 102 can be, for example, a liquid crystal or organic electroluminescence (EL) display 102.

Hereinafter described is a simulation method using the surgical simulator 10 according to this embodiment. This embodiment describes a surgical training in which Stanford type B aortic dissection occurred in the descending aorta after replacing at least a part of the aortic arch with an artificial blood vessel (elephant trunk) is treated by Thoracic Endovascular Aortic Repair. However, the surgical simulator 10 is not limited to such a surgical training. The surgical simulator 10 may be applied to any surgical training as long as it is for retreatment of the descending aorta after at least a part of the aortic arch is replaced with an artificial blood vessel (elephant trunk).

Figure 6:
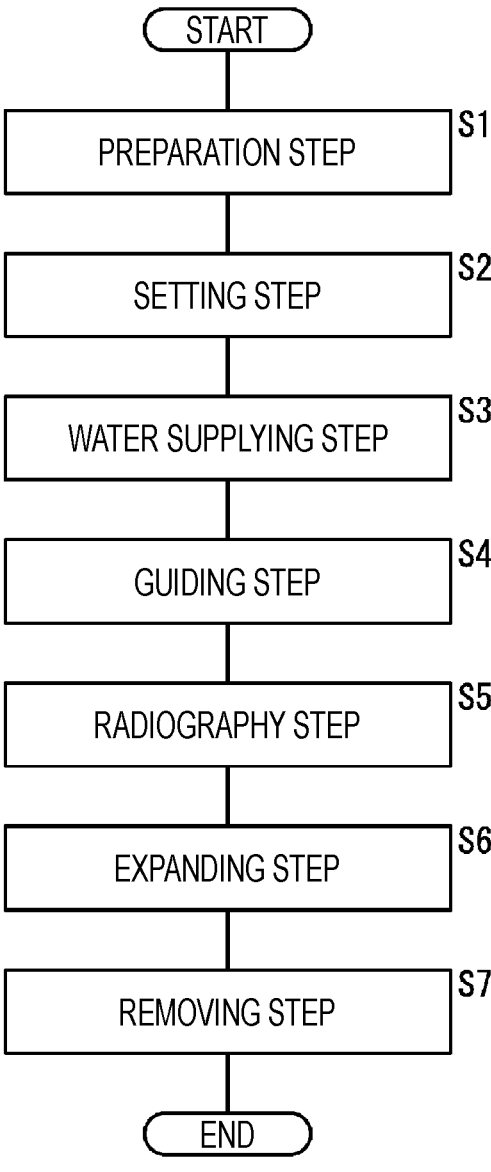
FIG. 6 is a flowchart for describing a simulation method using the surgical simulator of FIG. 1.

The simulation method according to this embodiment can include, as illustrated in FIG. 6, a preparation step, a setting step, a water supplying step, a guiding step, a radiography step, an expanding step, and a removing step.

First, in the preparation step (S1), the blood vessel model 24 is prepared. In the setting step (S2), a user sets the blood vessel model 24 as illustrated in FIG. 2. Specifically, in the setting step, the user submerges the aorta model 38 in the tank 18. Herein, the user places the aorta model 38 in a position shifted in the direction of arrow Y1 from the center of the tank 18 in Y direction. Furthermore, the user can adjust locking positions of the first lock 88a and the second lock 88b relative to the third side wall 28c of the tank 18 so as to deploy the aorta model 38 at a desired position and in a desired posture.

Next, in the water supplying step (S3), the user supplies water into the blood vessel model 24. Specifically, in the water supplying step, the user drives the pump 20. Accordingly, as illustrated in FIG. 7, the pump 20 suctions water stored in the tank 18 through the first connecting tube 36a and discharges into the second connecting tube 36b. The water discharged into the second connecting tube 36b is guided to the artificial blood vessel body 70 through the guiding tube 54, the simulated coronary artery 42c, the simulated aortic root 42a, and the simulated ascending aorta 42b. The water guided into the artificial blood vessel body 70 diverts into the third branched tube 72c and the simulated descending aorta 42d. The water flowing into the third branched tube 72c is led into the tank 18. The water flowing into the simulated descending aorta 42d flows into the simulated abdominal aorta 42e and the coupling tube 94, and then, splits (flows) into the simulated left femoral artery 96L and the simulated right femoral artery 96R. The water flowing into the simulated left femoral artery 96L is returned to the tank 18 through the third connecting tube 36c. The water flowing into the simulated right femoral artery 96R is returned to the tank 18 through the fourth connecting tube 36d.

After that, in the guiding step (S4 in FIG. 6), the user guides the medical device 200 (a catheter 204 having the tip embedded with the stent graft 202) to a lesion of the simulated vessel 42 (dissected portion 58). Specifically, the user inserts the medical device 200 into the simulated left femoral artery 96L from the check valve 98. The user operates the catheter 204 to advance the tip of the catheter 204 (stent graft 202) from the simulated left femoral artery 96L to the simulated descending aorta 42d through the simulated abdominal aorta 42e. At this time, the user inserts the tip of the catheter 204 into a lumen of the artificial blood vessel 48.

Figure 9:
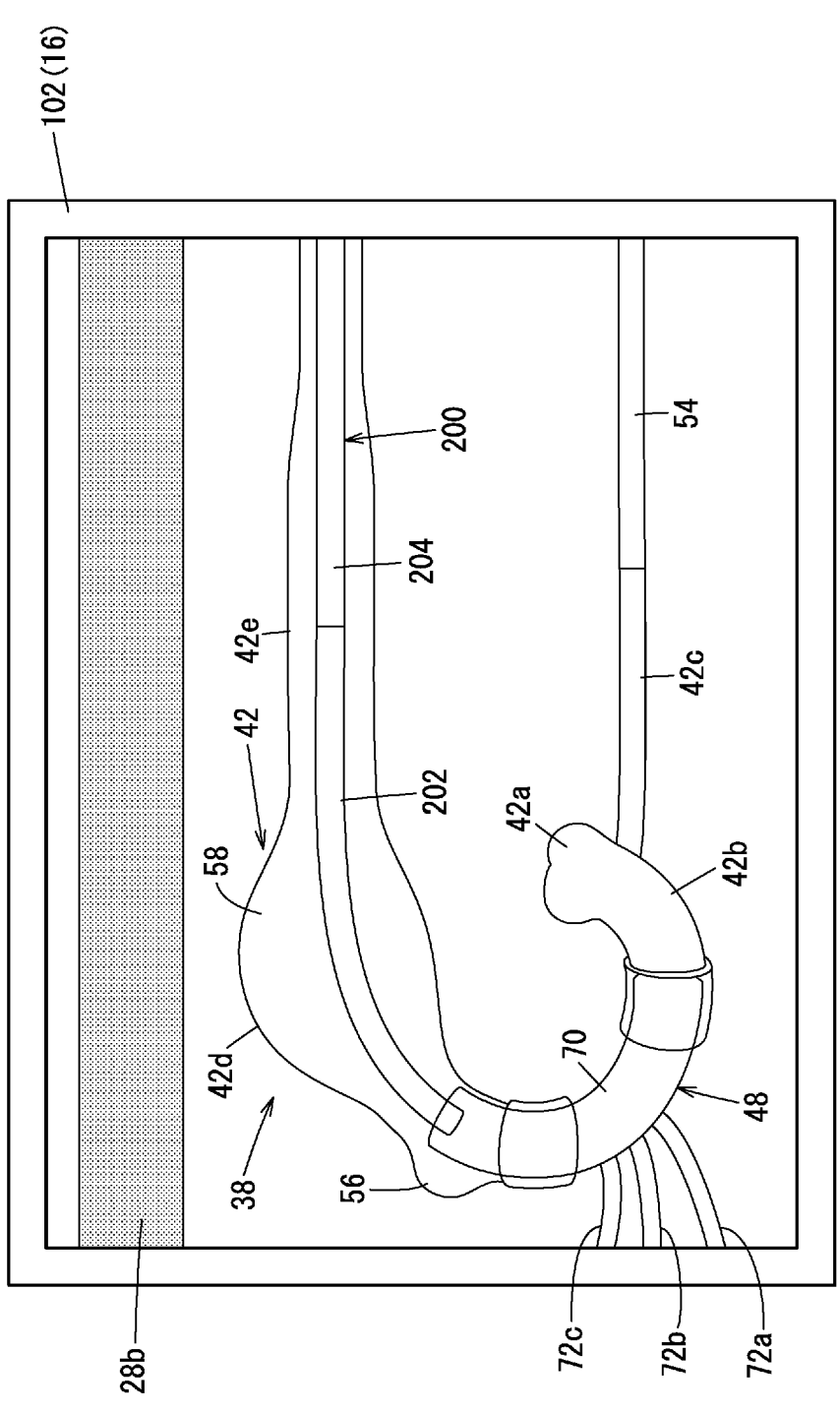
FIG. 9 is a view for describing a radiographic image captured in the radiography step.

Furthermore, in the radiography step (S5), the user drives the radiography device 16 to capture an image of the medical device 200 inside the aorta model 38. At this time, as illustrated in FIG. 8, the arm 106 is rotated (tilted) by a predetermined angle θ relative to the base 104. Specifically, the radiography device body 100 tilts the arm 106 so as to position the radiation source 108 closer to the second side wall 28b and to position the detector 110 closer to the first side wall 28a. In this case, the radiographic image shows the second side wall 28b (see FIG. 9). However, the aorta model 38 is separated from the second side wall 28b by the second interval L2, and the second side wall 28b in the radiographic image does not overlap the medical device 200. Accordingly, the medical device 200 can be checked visually in the radiographic image.

Figure 10:
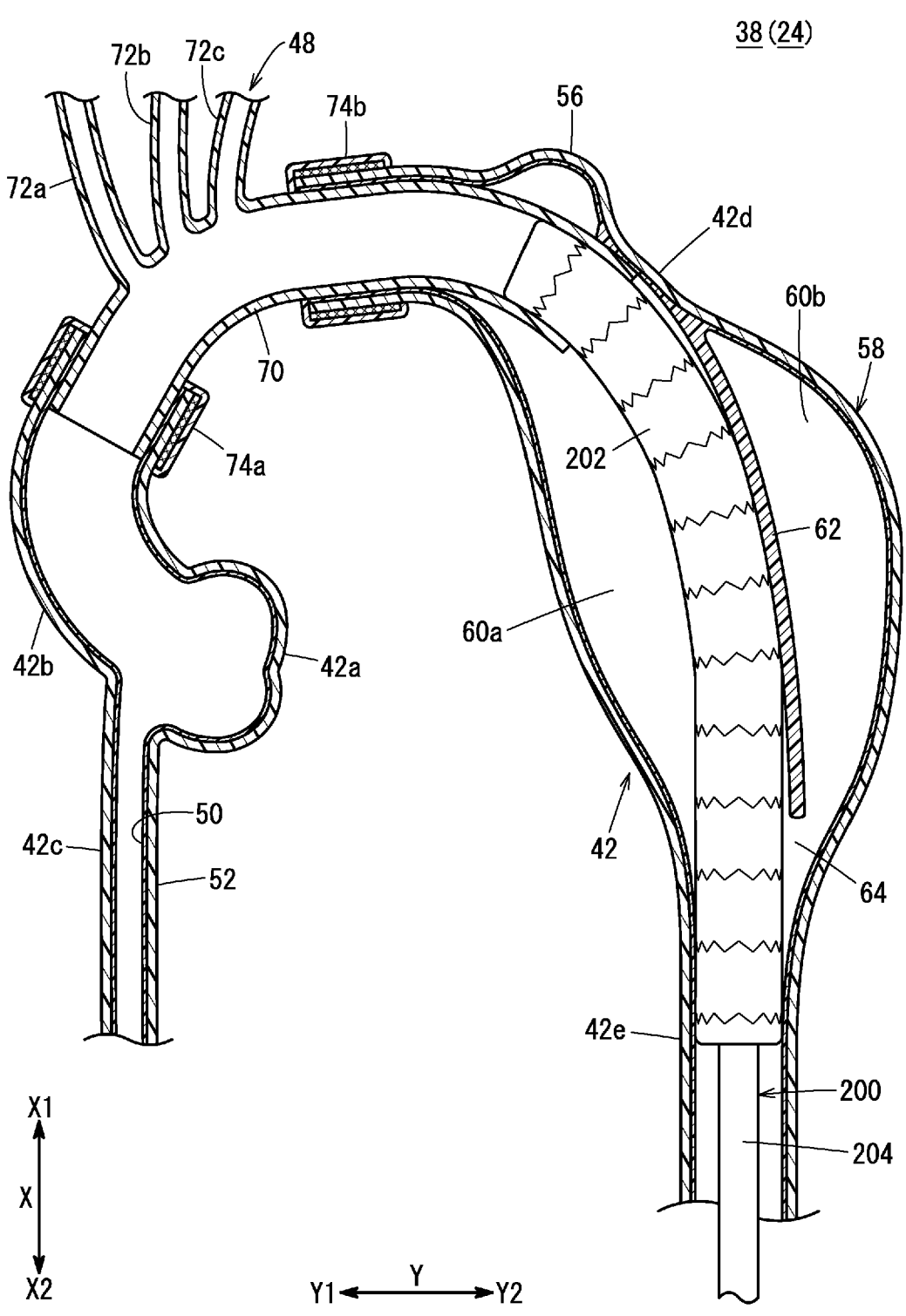
FIG. 10 is a view for describing a simulation method using the surgical simulator according to an embodiment of the disclosure.

Next, in the expanding step (S6 in FIG. 6), while the tip of the catheter 204 (stent graft 202) is placed in a position corresponding to the dissected portion 58 of the simulated descending aorta 42d, the user operates the catheter 204 to expand the stent graft 202, which causes the stent graft 202 to expand in diameter as illustrated in FIG. 10. Accordingly, one end of the stent graft 202 is pressed against (brought into contact with) the inner surface of the other end of the artificial blood vessel 48. In addition, an intermediate portion and the other end of the stent graft 202 is pressed against the inner surface of the simulated vessel 42. In other words, the hole 64 in the partition wall 62 of the dissected portion 58 is closed by the stent graft 202.

After that, in the removing step (S7 in FIG. 6), the user removes the catheter 204 from the blood vessel model 24. In this removing step, note that the stent graft 202 deployed may be removed from the blood vessel model 24 together with the catheter 204. In this case, although the stent graft 202 expands in diameter, the inner wall portion 50 of the simulated vessel 42 has elongation larger than that of the outer wall portion 52, which helps enable relatively smooth removal of the stent graft 202. After the removing step, the simulation using the surgical simulator 10 is complete.

The surgical simulator 10 and the simulation method according to this embodiment have the following effects.

In the surgical simulator 10, the blood vessel model 24 includes the aorta model 38 simulating a case of replacing a part of the thoracic aorta of a human body with an artificial blood vessel, and the aorta model 38 includes the simulated vessel 42 and the artificial blood vessel 48, or a medical device, connected to the simulated vessel 42.

According to this configuration, since the aorta model 38 includes the simulated vessel 42 and the artificial blood vessel 48, it is possible to simulate Thoracic Endovascular Aortic Repair for a complicated case of replacing a part of the thoracic aorta with an artificial blood vessel. Therefore, it is possible to learn Thoracic Endovascular Aortic Repair rather efficiently.

The artificial blood vessel 48 of the aorta model 38 is placed in a part of the aorta model 38 corresponding to at least a part the aortic arch of a human body.

With this configuration, Thoracic Endovascular Aortic Repair can be simulated for a case of replacing at least a part of the aortic arch with an artificial blood vessel. In addition, at least a part of the outside of the artificial blood vessel 48 is not provided with the aorta model 38, and the wall of the plastic blood vessel does not disturb a feeling of inserting the stent graft 202 into the artificial blood vessel 48, which makes it possible to simulate a feeling of the actual thoracic aorta being stretched during Thoracic Endovascular Aortic Repair.

The first connection 74a between the simulated vessel 42 and the artificial blood vessel 48 of the aorta model 38 includes the first annular end 78a that forms the simulated vessel 42 (simulated ascending aorta 42b) and the first annular connection 76a that forms the artificial blood vessel 48 of the aorta model 38. The first annular connection 76a is connected to the first annular end 78a in a liquid-tight manner while being inserted into a lumen of the first annular end 78a. Furthermore, the second connection 74b between the simulated vessel 42 and the artificial blood vessel 48 of the aorta model 38 includes the second annular end 78b that forms the simulated vessel 42 (simulated descending aorta 42d) and the second annular connection 76b that forms the artificial blood vessel 48 of the aorta model 38. The second annular connection 76b is connected to the second annular end 78b in a liquid-tight manner while being inserted into a lumen of the second annular end 78b.

Such a configuration makes it possible to prevent the water in the aorta model 38 from leaking from the first connection 74a and the second connection 74b.

The first connection 74a includes the soft plastic first non-woven fabric 80a located on the outer periphery of the first annular end 78a. The first annular connection 76a, the first annular end 78a, and the first non-woven fabric 80a overlapping each other are sewn with the first suture 82a. The second connection 74b includes the soft plastic second non-woven fabric 80b located on the outer periphery of the second annular end 78b. The second annular connection 76b, the second annular end 78b, and the second non-woven fabric 80b overlapping each other are sewn with the second suture 82b.

With this configuration, it is possible to approximate softness of the first connection 74a and the second connection 74b to that of a connection between the actual thoracic aorta and the artificial blood vessel 48. What is more, while maintaining the strength, it is possible to connect the plastic simulated vessel 42 and the artificial blood vessel 48 which normally cannot adhere to each other. Accordingly, even when arterial pressure is applied to the water in the aorta model 38, the artificial blood vessel 48 is efficiently prevented from slipping from the simulated vessel 42. In addition, the first connection 74a provided with the first non-woven fabric 80a helps prevent a tear in the simulated vessel 42 (first annular end 78a) when being sewn with the first suture 82a. The second connection 74b provided with the second non-woven fabric 80b also helps prevent a tear in the simulated vessel 42 (second annular end 78b) when being sewn with the second suture 82b.

The first connection 74a includes the plastic first sealing member 84a included in the first non-woven fabric 80a. The second connection 74b includes the plastic second sealing member 84b included in the second non-woven fabric 80b.

Such a configuration further helps prevent the water in the aorta model 38 from leaking from the first connection 74a and the second connection 74b.

The blood vessel model 24 includes the simulated femoral artery 90 mimicking the femoral artery of a human body and the block 92 embedded with the simulated femoral artery 90. The simulated vessel 42 and the simulated femoral artery 90 both include a relatively soft plastic material, and the block 92 includes a relatively hard plastic material.

With this configuration, when arterial pressure is applied to the water in the blood vessel model 24, the block 92 helps prevent the arterial pressure from escaping from the simulated femoral artery 90. Accordingly, it is possible to pulsate the simulated vessel 42 like the actual thoracic aorta. Furthermore, it is possible to enhance the durability of the simulated femoral artery 90. Particularly, in a case where a simulated vessel composed of a plastic tube is used, the stent graft 202 is inserted into the tube rather unsmoothly and does not advance in the direction of insertion or causes the simulated vessel kinks. Embedding the simulated femoral artery 90 in a relatively hard plastic helps enable smooth stent graft insertion into the simulated femoral artery 90.

The surgical simulator 10 is provided with the tank 18 having a box shape configured to store water and house the aorta model 38 submerged in the water, the connection circuit 22 configured to cause the water in the tank 18 to circulate in the blood vessel model 24, and the pump 20 configured to apply arterial pressure to the water in the blood vessel model 24.

Such a configuration can pulsate the simulated vessel 42 rather efficiently. Furthermore, even if the water leaks from the connection (the first connection 74a or the second connection 74b) between the artificial blood vessel 48 and the simulated vessel 42, devices disposed outside the tank 18 (such as the operating table 12 and the radiography device 16) can be prevented from getting wet.

The tank 18 includes the bottom wall 26 and includes the first side wall 28a and the second side wall 28b protruding from the bottom wall 26 to face each other. The first interval L1 between the aorta model 38 and the first side wall 28a is shorter than the second interval L2 between the aorta model 38 and the second side wall 28b, and the second interval L2 is longer than the height H1 of the second side wall 28b.

With this configuration, when the aorta model 38 is irradiated obliquely from above (from above the second side wall 28b) to capture a radiographic image during Thoracic Endovascular Aortic Repair, it is possible to help prevent the second side wall 28b from overlapping the aorta model 38 in the radiographic image.

The simulated vessel 42 includes the tubular inner wall portion 50 and the tubular outer wall portion 52 on the outer periphery of the inner wall portion 50. The inner wall portion 50 and the outer wall portion 52 each includes a relatively soft plastic material, and the inner wall portion 50 has elongation larger than that of the outer wall portion 52.

With this configuration, the inner wall portion 50 to which the medical device 200 comes into contact during Thoracic Endovascular Aortic Repair stretches in the longitudinal direction (direction of insertion of the medical device 200), and the stent graft 202 can be prevented from being stacked in the inner wall portion 50 when inserting the medical device 200 (and even when removing the stent graft 202). Furthermore, when the stent graft 202 expands in diameter, the simulated vessel 42 can be prevented from expanding rather excessively in the radial direction.

The simulated vessel 42 includes the partition wall 62 configured to partition a lumen of the simulated vessel 42 into the true lumen 60a and the false lumen 60b, and the partition wall 62 is provided with the hole 64 that allows the true lumen 60a and the false lumen 60b to communicate with each other.

Such a configuration enables reproduction of the dissected portion 58 in the simulated vessel 42.

The simulation method using the surgical simulator 10 includes: the water supplying step for supplying water in the blood vessel model 24; the guiding step for operating the catheter 204 while the water flows in the blood vessel model 24 to guide the stent graft 202 embedded in the tip of the catheter 204 into the aorta model 38; and the expanding step for expanding the stent graft 202 after the guiding step.

This simulation method has effects similar to those obtained by the surgical simulator 10.

The present disclosure is not limited to the embodiment described above and may be modified in various manners without departing from the gist of the present disclosure.

The following description summarizes the embodiment.

The embodiment discloses a surgical simulator 10 including a blood vessel model 24. The blood vessel model includes an aorta model 38 simulating a case of replacing a part of the thoracic aorta of a human body with an artificial blood vessel. The aorta model includes a simulated vessel 42 and an artificial blood vessel 48, or a medical device, connected to the simulated vessel.

In the surgical simulator, the artificial blood vessel of the aorta model may be located in a part of the aorta model corresponding to at least a part of the aortic arch of a human body.

In the surgical simulator, the aorta model has a connection 74a and 74b between the simulated vessel and the artificial blood vessel, and the connection may include an annular end 78a and 78b that forms the simulated vessel and an annular connection 76a and 76b that forms the artificial blood vessel of the aorta model. The annular connection may be connected to the annular end in a liquid-tight manner while being inserted into a lumen of the annular end.

In the surgical simulator, the connection may include a non-woven fabric 80a and 80b including a soft plastic and located on outer periphery of the annular end. The annular connection 76a and 76b, the annular end 78a and 78b, and the non-woven fabric 80a and 80b may be sewn with a suture 82a and 82b while overlapping each other.

In the surgical simulator, the connection may include a plastic sealing member 84a and 84b included in the non-woven fabric 80a and 80b.

In the surgical simulator, the blood vessel model may include a simulated femoral artery 90 simulating the femoral artery of a human body and a block 92 embedded with the simulated femoral artery. The simulated vessel and the simulated femoral artery may both include a soft plastic material, and the block may include a hard plastic material.

In the surgical simulator, the surgical simulator may include a tank 18 having a box shape configured to store water and house the aorta model submerged in the water, a connection circuit 22 configured to cause the water in the tank to circulate in the blood vessel model, and a pump 20 configured to apply arterial pressure to the water in the blood vessel model.

In the surgical simulator, the tank may include a bottom wall 26 and include a first side wall 28a and a second side wall 28b protruding from the bottom wall to face each other. The aorta model may have a first interval L1 between the first side wall 28a. The first interval L1 may be shorter than a second interval L2 between the aorta model and the second side wall 28b, and the second interval L2 may be longer than a height H1 of the second side wall 28b.

In the surgical simulator, the simulated vessel may include a tubular inner wall portion 50 and a tubular outer wall portion 52 located on outer periphery of the inner wall portion 50. The inner wall portion 50 and the outer wall portion 52 may both include a soft plastic material, and the inner wall portion 50 may have elongation larger than elongation of the outer wall portion 52.

In the surgical simulator, the simulated vessel may include a partition wall 62 configured to partition a lumen of the simulated vessel into a true lumen 60a and a false lumen 60b, and the partition wall may be provided with a hole 64 that allows the true lumen 60a and the false lumen 60b to communicate with each other.

The embodiment discloses a simulation method using the aforementioned surgical simulator, the method involving: a water supplying step for supplying water in the blood vessel model; a guiding step for operating a catheter 204 while the water flows in the blood vessel model to guide a stent graft 202 embedded in a tip of the catheter into the aorta model; and an expanding step for expanding the stent graft after the guiding step.

The detailed description above describes embodiments of a surgical simulator and a simulation method. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A surgical simulator comprising:
a blood vessel model, the blood vessel model including an aorta model simulating a case of replacing a part of a thoracic aorta of a human body with an artificial blood vessel; and
the aorta model including a simulated vessel and the artificial blood vessel, or a medical device, connected to the simulated vessel; and
wherein the simulated vessel includes a partition wall configured to partition a lumen of the simulated vessel into a true lumen and a false lumen, the partition wall being provided with a hole that allows the true lumen and the false lumen to communicate with each other.

2. The surgical simulator according to claim 1, wherein the artificial blood vessel of the aorta model is located in a part of the aorta model corresponding to at least a part of an aortic arch of a human body.

3. The surgical simulator according to claim 1, wherein the aorta model includes a connection between the simulated vessel and the artificial blood vessel, the connection including an annular end that forms the simulated vessel and an annular connection that forms the artificial blood vessel of the aorta model; and
the annular connection being connected to the annular end of the connection in a liquid-tight manner while being inserted into a lumen of the annular end of the connection.

4. The surgical simulator according to claim 3, wherein the connection includes a non-woven fabric including a soft plastic, the non-woven fabric located on an outer periphery of the annular end of the connection; and
the annular connection, the annular end of the connection, and the non-woven fabric are sewn with a suture while overlapping each other.

5. The surgical simulator according to claim 4, wherein the connection includes a plastic sealing member included in the non-woven fabric.

6. The surgical simulator according to claim 1, wherein the blood vessel model includes a simulated femoral artery simulating a femoral artery of a human body and a block embedded with the simulated femoral artery;
the simulated vessel and the simulated femoral artery both including a soft plastic material; and
the block including a hard plastic material.

7. The surgical simulator according to claim 1, the surgical simulator comprising:
a tank having a box shape configured to store water and house the aorta model submerged in the water;
a connection circuit configured to circulate the stored water in the tank into the blood vessel model; and
a pump configured to apply arterial pressure to the water in the blood vessel model.

8. The surgical simulator according to claim 7, wherein the tank includes a bottom wall, a first side wall, and a second side wall protruding from the bottom wall of the tank, the first side wall and the second side wall face each other; and
the aorta model has a first interval between the aorta model and the first side wall, the first interval being shorter than a second interval between the aorta model and the second side wall, and the second interval being longer than a height of the second side wall.

9. The surgical simulator according to claim 1, wherein the simulated vessel includes a tubular inner wall portion and a tubular outer wall portion located on an outer periphery of the inner wall portion; and
the inner wall portion and the outer wall portion both including a soft plastic material, and the inner wall portion having elongation larger than elongation of the outer wall portion.

10. A surgical simulator comprising:
a blood vessel model, the blood vessel model including an aorta model simulating a case of replacing a part of an thoracic aorta of a human body with an artificial blood vessel, the aorta model including a simulated vessel and the artificial blood vessel, the aorta model including a connection between the simulated vessel and the artificial blood vessel, the connection including an annular end that forms the simulated vessel and an annular connection that forms the artificial blood vessel of the aorta model, the annular connection being connected to the annular end in a liquid-tight manner while being inserted into a lumen of the annular end, the simulated vessel including a partition wall configured to partition a lumen of the simulated vessel into a true lumen and a false lumen, the partition wall being provided with a hole that allows the true lumen and the false lumen to communicate with each other;

a tank configured to house the aorta model submerged in water, the tank including a bottom wall, a first side wall, and a second side wall protruding from the bottom wall of the tank, and wherein the first side wall and the second side wall face each other;

a connection circuit configured to circulate the water in the tank into the blood vessel model;

a pump configured to apply arterial pressure to the water in the blood vessel model; and wherein the aorta model has a first interval between the aorta model and the first side wall, the first interval being shorter than a second interval between the aorta model and the second side wall, and the second interval being longer than a height of the second side wall.

11. The surgical simulator according to claim 10, wherein the connection includes a non-woven fabric, the connection being located on an outer periphery of the annular end;

the annular connection, the annular end, and the non-woven fabric are sewn with a suture while overlapping each other; and wherein the connection includes a plastic sealing member included in the non-woven fabric.

12. The surgical simulator according to claim 10, wherein the blood vessel model includes a simulated femoral artery simulating a femoral artery of a human body and a block embedded with the simulated femoral artery;

the simulated vessel and the simulated femoral artery both including a soft plastic material; and the block including a hard plastic material.

13. A simulation method using the surgical simulator of claim 1, the method comprising:

supplying water into the blood vessel model;

operating a catheter while the water flows in the blood vessel model to guide a stent graft embedded in a tip of the catheter into the aorta model; and expanding the stent graft after the guiding of the stent graft embedded in the tip of the catheter into the aorta model.

14. The simulation method according to claim 13, further comprising:

submerging the aorta model in the water in a tank; and deploying the aorta model in the water in the tank at a desired position and in a desired posture by adjusting one or more locks relative to a side wall of the tank.

15. The simulation method according to claim 14, further comprising:

supplying the water into the blood vessel model by suction through a first connecting tube to a pump; and supplying the water from the pump through a second connecting tube to the artificial blood vessel body through a simulated coronary artery, a simulated aortic root, and a simulated ascending aorta.

16. The simulation method according to claim 15, further comprising:

diverting the water from the artificial blood vessel body into a branched tube and a simulated descending aorta, the branched tube extending into the tank.

17. The simulation method according to claim 16, further comprising:

flowing the water from the simulated descending aorta into a simulated abdominal aorta;

diverting the water from the simulated abdominal aorta into a simulated left femoral artery and a simulated right femoral artery;

returning the water to the tank from the simulated left femoral artery through a third connecting tube; and returning the water to the tank from the simulated right femoral artery through a fourth connecting tube.

18. The simulation method according to claim 17, wherein the guiding of the catheter having the tip embedded with the stent graft further comprises:

inserting the catheter into the simulated left femoral artery from a check valve;

advancing the tip of the catheter from the simulated left femoral artery to the simulated descending aorta through the simulated abdominal aorta; and inserting the tip of the catheter into a lumen of the artificial blood vessel.

19. The simulation method according to claim 14, further comprising:

driving a radiography device to capture an image of the medical device inside the aorta model by rotating an arm of the radiography device by a predetermined angle relative to a base of the radiography device so as to position a radiation source closer to one side wall of the tank and to position a detector closer to another side wall of the tank; and visually checking the catheter in a radiographic image.

* * * * *